(12) United States Patent
Lin

(10) Patent No.: US 8,527,338 B2
(45) Date of Patent: Sep. 3, 2013

(54) MOBILE ADVERTISEMENT METHODS AND SYSTEMS

(75) Inventor: Jie Lin, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1199 days.

(21) Appl. No.: 11/676,047

(22) Filed: Feb. 16, 2007

(65) Prior Publication Data
US 2008/0201215 A1 Aug. 21, 2008

(51) Int. Cl.
*G06Q 30/00* (2012.01)
*G05B 19/418* (2006.01)

(52) U.S. Cl.
USPC ............................ 705/14.4; 345/1.3; 707/803

(58) Field of Classification Search
USPC .............................. 705/14; 345/1.3; 707/803
See application file for complete search history.

(56) References Cited

U.S. PATENT DOCUMENTS

| | | | |
|---|---|---|---|
| 4,126,854 A | 11/1978 | Sheridon | |
| 4,143,103 A | 3/1979 | Sheridon | |
| 6,122,850 A | 9/2000 | Strzeletz | |
| 6,545,596 B1 | 4/2003 | Moon | |
| 6,588,131 B2 | 7/2003 | O'Connell, Jr. | |
| 6,850,209 B2* | 2/2005 | Mankins et al. | 345/1.3 |
| 7,154,383 B2 | 12/2006 | Berquist | |
| 2002/0120629 A1* | 8/2002 | Leonard | 707/100 |
| 2004/0016158 A1 | 1/2004 | Kim | |
| 2006/0288571 A1* | 12/2006 | Seo et al. | 29/842 |

OTHER PUBLICATIONS

"DHTML Diner", pp. 1 and 2, http://www.webreference.com/dhtml/diner/frresize/.*
"New Millennium Media Enters Strategic Relationship With Cinema Screen Media Inc." Business Wire, p. 2308. Mar. 27, 2002.*

* cited by examiner

*Primary Examiner* — Victoria Vanderhorst
(74) *Attorney, Agent, or Firm* — Fox Rothschild LLP

(57) ABSTRACT

A method of displaying an advertisement on a vehicle comprising the steps of detecting a user's wireless transmission, receiving information pertaining to an advertisement from a user via a wireless interface, activating an electronic paper screen by supplying power to the screen, displaying the advertisement on the electronic paper screen and removing the power to the electronic paper screen such that the advertisement may still be displayed on the electronic paper screen after the power is removed.

6 Claims, 6 Drawing Sheets

MOBILE ADVERTISEMENT METHODS AND SYSTEMS

BACKGROUND

Display technologies using encapsulated electrophoretic particles, multichromal beads and liquid crystals are commonly referred to as electronic paper. A group of encapsulated bichromal beads, cylinders, crystals or other bichromal or multichromal particles can be dispersed in an elastomeric sheet swollen by a fluid and positioned atop a conductive substrate. The particles, fluid and substrate are covered with a transparent layer such as glass or plastic and a transparent conductive material such as indium tin oxide, and are sealed to form a display material. The particles in the display material rotate in response to an electric or magnetic field that is applied to the conductive substrate. Such materials have been described in, for example, U.S. Pat. Nos. 4,126,854 to Sheridon and 4,143,103 to Sheridon, the disclosures of each of which are incorporated herein by reference in their entirety.

Bichromal displays have numerous advantages over conventional electrically addressable visual displays, such as LCD and CRT displays. In particular, they are suitable for viewing in ambient light, they retain an image indefinitely in the absence of an applied electric field, and they can be made lightweight, flexible, foldable, and with many other familiar and useful characteristics of ordinary writing paper. Thus, at least in principle, they are suitable both for display applications and for so-called electric paper or interactive paper applications, in which they serve as an electrically addressable, reusable substitute for ordinary paper.

Outdoor advertising displays are common. Conventional outdoor advertisements on public transportation systems are typically displayed in a static form, such as painted on the exterior of a bus or the interior of a subway. As such, these advertisements cannot be dynamically modified or updated. Moreover, the cost of replacing such advertisements is high. In addition, such advertisements cannot be dynamically updated based on proximity to an advertiser.

The disclosure contained herein describes the methods of resolving one or more of the problems discussed above.

SUMMARY

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural reference unless the context clearly dictates otherwise. Thus, for example, reference to a "code" is a reference to one or more codes and equivalents thereof known to those skilled in the art, and so forth. Unless defined otherwise, all technical and scientific terms used herein have the same meanings as commonly understood by one of ordinary skill in the art. As used herein, the term "comprising" means "including, but not limited to."

In an embodiment, a method of displaying an advertisement on a vehicle may include detecting, at the vehicle, a user's wireless transmission, receiving information pertaining to an advertisement from a user via a wireless interface, activating an electronic paper screen by supplying power to the screen, displaying the advertisement on an electronic paper screen and removing power from the screen. The advertisement may remain on the screen after the power is removed.

In an alternate embodiment, a method of displaying an advertisement on a vehicle may include receiving information pertaining to an advertisement from an advertising agency, storing the information in memory, detecting, at the vehicle, a user's wireless transmission, receiving an advertisement identifier from the user that corresponds to the advertisement information, activating an electronic paper screen by supplying power to the screen, displaying the advertisement on the electronic paper screen and removing power from the screen. The advertisement may remain on the screen after the power is removed.

In another embodiment, a system for displaying an advertisement on a vehicle may include a vehicle, a wireless receiver, a processor in communication with the receivers an electronic paper screen located on the exterior of the vehicle and a processor readable storage medium. The processor readable storage medium may contain programming instructions for displaying an advertisement on the vehicle by detecting a user's wireless transmission, receiving advertisement information from the user, activating the electronic paper screen, displaying the advertisement on the electronic paper screen and removing power from the electronic paper screen such that the advertisement remains on the screen even after the power is removed.

In another embodiment, a system for displaying an advertisement on a vehicle may include a vehicle, a wireless receiver, a processor in communication with the receiver, an electronic paper screen located on the exterior of the vehicle and a processor readable storage medium. The processor readable storage medium may contain programming instructions for displaying an advertisement on the vehicle by receiving advertisement information from an advertising agency, storing the advertisement informant in memory, detecting a user's wireless transmission, receiving an advertisement identifier that corresponds to the advertisement information from the user, activating the electronic paper screen, such that the advertisement remains on the screen even after the power the removed.

DETAILED DESCRIPTION

Figure 1:
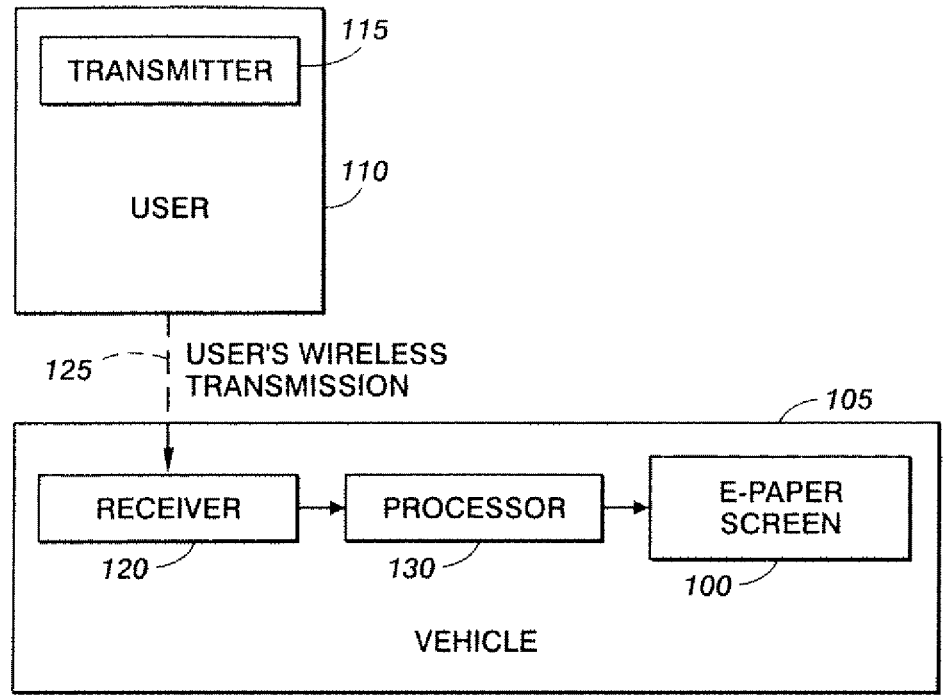
FIG. 1 depicts exemplary elements of a mobile advertisement system according to an embodiment.

Exemplary elements of a mobile advertisement system, as illustrated in FIG. 1, may include an electronic paper screen 100 located on the exterior of a vehicle 105, such as a bus, taxi cab, train or billboard vehicle. The electronic paper screen 100 may include a flat panel display capable of displaying electronic text and graphics. Unlike a conventional electronic billboard that may include a fixed-pattern display for displaying advertisements only as fixed patterns, the electronic paper screen may include an arbitrary pattern display for displaying advertisements as arbitrary patterns. The dimensions of the electronic paper screen 100 may be sufficiently large to operate as an effective display medium and sufficiently durable to endure outdoor conditions such as wind, rain, snow and the like. In an embodiment, the electronic paper screen 100 may include a weather resistant, translucent covering to protect it from such outdoor conditions.

In an embodiment, a user's location 110 may be equipped with a wireless transmitter 115. User locations 110 may include, but are not limited to, stores, commercial establishments, malls, entertainment venues, universities, landmarks, movie theaters, athletic stadiums and the like. When a vehicle 105 with an electronic paper screen 100 travels within range of a user's wireless transmitter 115, the transmitter 115 may send a wireless transmission 125 which may be detected by a receiver 120. The transmitter 115 may be a wireless terminal, a computer with wireless capability, a Bluetooth enabled device or any other device capable of transmitting wirelessly. The receiver may be located on or in the vehicle 105, and may be a computer with wireless capability, a Bluetooth enabled device, or any other wireless device. The receiver 120 may transmit the advertisement information to a processor 130, which may be located in the vehicle 105 or at a remote central location. The processor 130 may activate the electronic paper screen 100 by supplying power to the screen 100. The processor 130 may then communicate the advertising information to the electronic paper screen 100 and instruct the electronic paper screen 100 to display the user's advertisement, thus providing interactive, localized and customized advertising. The advertisement may include text and/or images. Once the advertisement is displayed, the processor 130 may remove power from the electronic paper screen 100, but the advertisement may remain displayed on the screen 100. In an embodiment, the advertisement may still be displayed on the electronic paper screen after power is removed.

Figure 2:
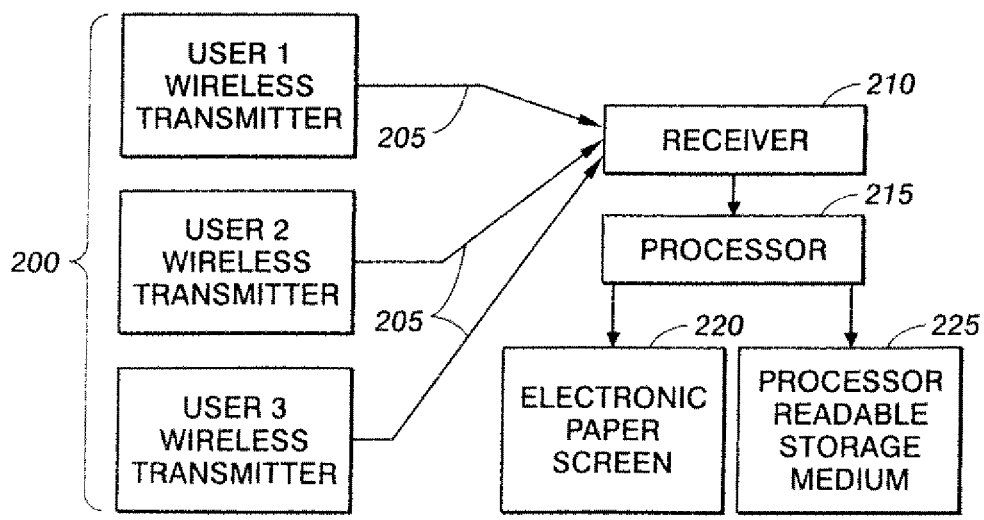
FIG. 2 depicts an exemplary system of displaying an advertisement on a vehicle according to an embodiment.

In an embodiment, as illustrated in FIG. 2, a system for displaying an advertisement on a vehicle may comprise a wireless receiver 210 located on or in the vehicle, a processor 215 in communication with the receiver 210, an electronic paper screen 220 in communication with the processor 215 and a processor readable storage medium 225 in communication with the processor 215. When the receiver 210 detects a user's wireless transmission 205, the receiver 210 may receive information pertaining to an advertisement. The receiver 210 may then communicate the advertisement information to the processor 215 which may activate the electronic paper screen 220 and instruct the electronic paper screen 220 to display the user's advertisement.

Figure 3:
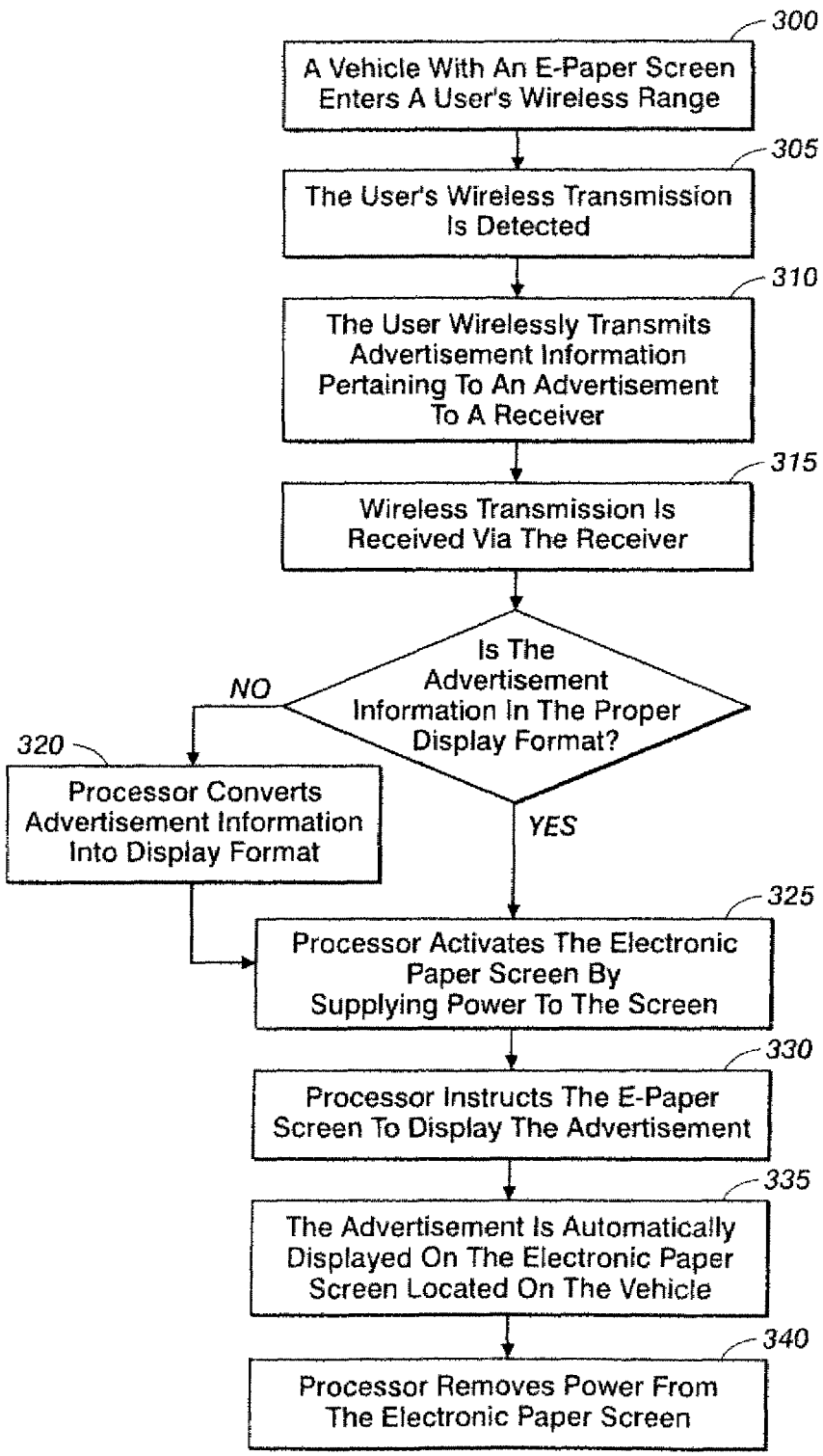
FIG. 3 depicts an exemplary method of displaying an advertisement on a vehicle according to an embodiment.

In an embodiment, as illustrated in FIG. 3, a vehicle with an electronic paper screen may enter the range of a user's wireless transmitter 300. When a receiver detects 305 a user's wireless transmission, information pertaining to the advertisement may be received 310 by the receiver, which is in communication with the processor. The advertisement information may include, among other things, text and/or images to be displayed, the dimensions of the advertisement, a position at which to place the advertisement and/or other information associated with the advertisement. In an embodiment, the processor may convert 320 the advertising information into a proper display format so that the user's advertisement may be displayed on the electronic paper screen. In another embodiment, the advertisement information may be received in the proper display format, so no conversion may be required. When the advertisement information is received 315, the processor may activate 325 the electronic paper screen by supplying power to the screen. The processor may then instruct 330 the electronic paper screen to automatically display 335 the user's advertisement. After the advertisement is displayed, the processor may remove 340 power to the electronic paper screen. In an embodiment, the advertisement may still be displayed on the electronic paper screen after the power is removed. Wireless transmission of the advertisement information may enable a user to dynamically personalize, customize and update its advertising content. For example, if one hour remains for a Shoe Store user's sale, the Shoe Store user may transmit advertising content such as "Shoe Spectacular—One Hour Left—Best Shoes in Town are Behind You!" This advertisement may be displayed on the electronic paper screen of the vehicles that pass by, thus quickly informing passerbys that the sale is almost over.

Figure 4:
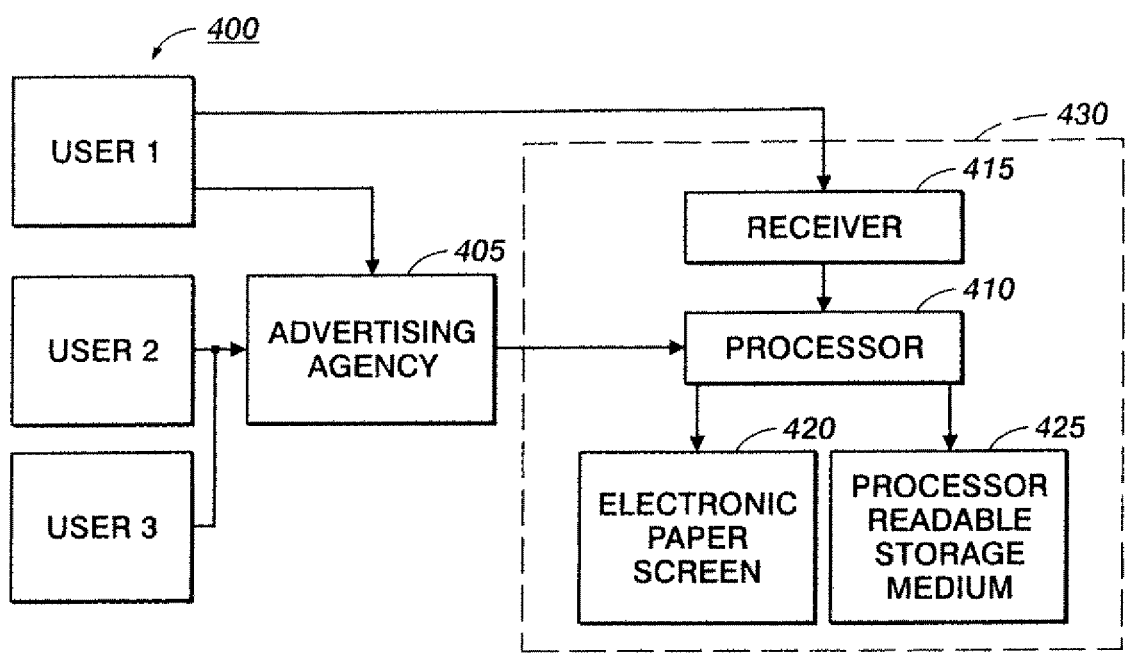
FIG. 4 depicts an exemplary system of displaying an advertisement on a vehicle by transmitting advertisement information in advance according to an embodiment.

In an embodiment, as illustrated in FIG. 4, a system for displaying an advertisement on a vehicle 430 may comprise a plurality of users 400, an advertising agency 405, at least one processor 410 in communication with a receiver 415, an electronic paper screen 420 and a processor readable storage medium 425, A user may transmit advertising information to an advertising agency 405. The advertising agency 405 may download the advertising information to one or more processors 410. When a user's signal is detected, the advertising information may be retrieved and displayed.

Figure 5:
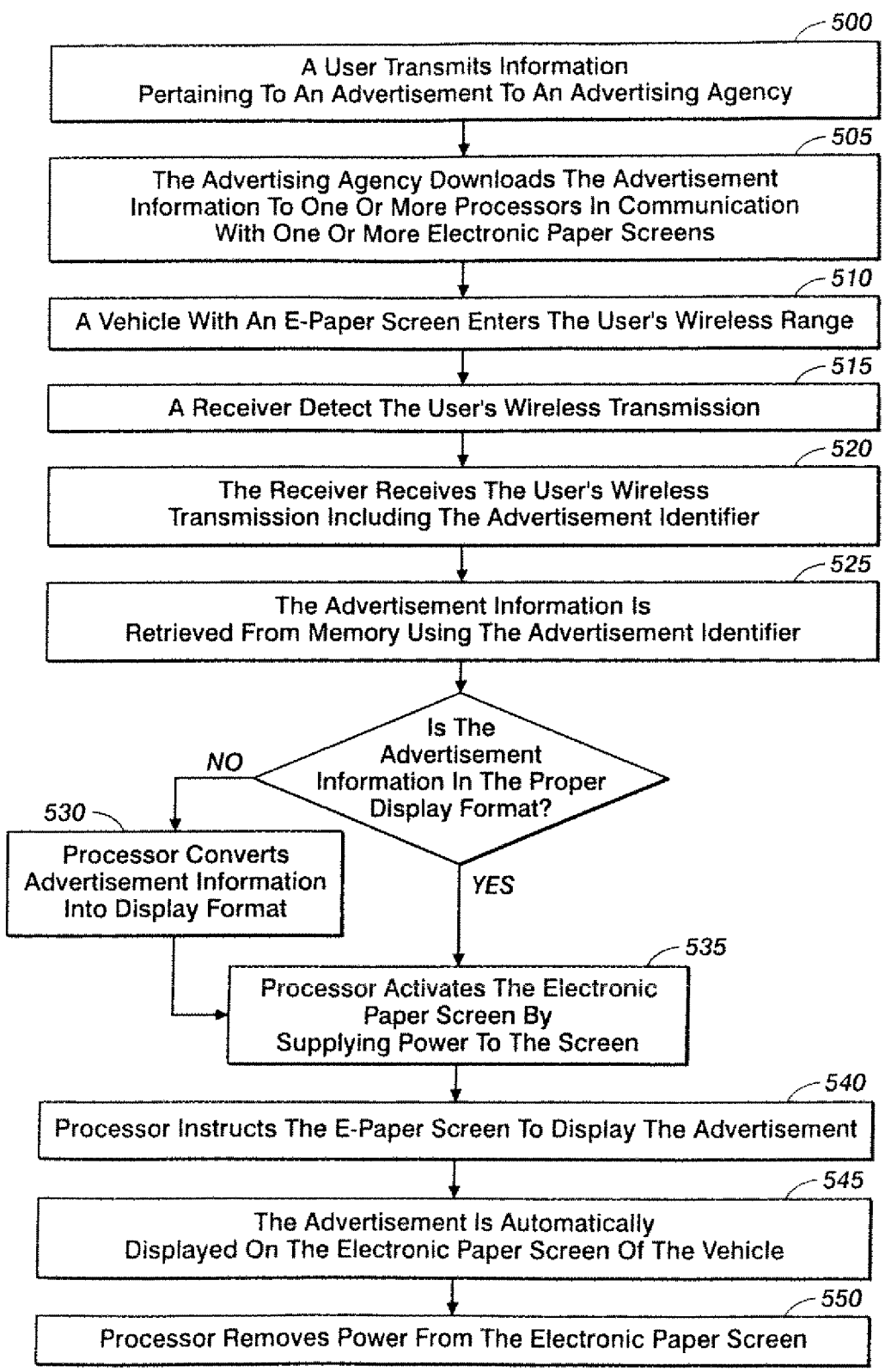
FIG. 5 depicts an exemplary method of displaying an advertisement on a vehicle by downloading the information pertaining to the advertisement to one or more processors in communication with a receiver and one or more electronic screens according to an embodiment.

In an embodiment as illustrated in FIG. 5, a user's advertisement information may be pre-stored on a processor readable storage medium in communication with the processor. A user may transmit 500 information pertaining to an advertisement to an advertising agency. The advertisement information may be transmitted to the advertising agency by email, by fax, or by mail, among other ways. The advertising agency, in turn, may download 505 the information to one or more processors in communication with one or more electronic paper screens. A vehicle with an electronic paper screen may enter 510 the range of a user's wireless transmitter. A receiver may detect 515 a user's wireless transmission which may include an advertisement identifier. The advertisement identifier may correspond to the user's advertisement information and the advertisement to be displayed. When the user's wireless transmission is received 520, the advertisement information may be retrieved 525 from the processor readable storage medium using the advertisement identifier. In an embodiment, the processor may convert 530 the advertising information into a proper display format so that the user's advertisement may be displayed on the electronic paper screen. In another embodiment, the advertisement information may be in the proper display format, so no conversion may be required. After the advertisement information is retrieved, the processor may activate 535 the electronic paper screen by supplying power to the screen. The processor may then instruct 540 the electronic paper screen to automatically display 545 the user's advertisement. After the advertisement is displayed, the processor may remove 550 power from the electronic paper screen. In an embodiment, the advertisement may still be displayed on the electronic paper screen after the power is removed.

For example, if a fast food restaurant wants its advertisement "'Eat at Lucky's" displayed on passing vehicles, it may send the information associated with the advertisement to the advertising agency. Once the advertising agency downloads the advertisement information, "Eat at Lucky's" may be automatically displayed whenever the restaurant's signal is detected. In such an embodiment, the advertisement may be displayed more quickly because real time transmission of advertising information is not required.

In an embodiment, the user's advertisement may remain on the electronic paper screen until the receiver detects a second user's wireless signal. In an alternate embodiment, the advertisement may remain on the screen for a specified period of time. The user, the advertising agency, or the processor, among others, may specify the time period for an advertisement to remain on the electronic paper screen. In an alternate embodiment, the advertisement may be displayed until the user's wireless transmission is no longer detected.

Figure 6:
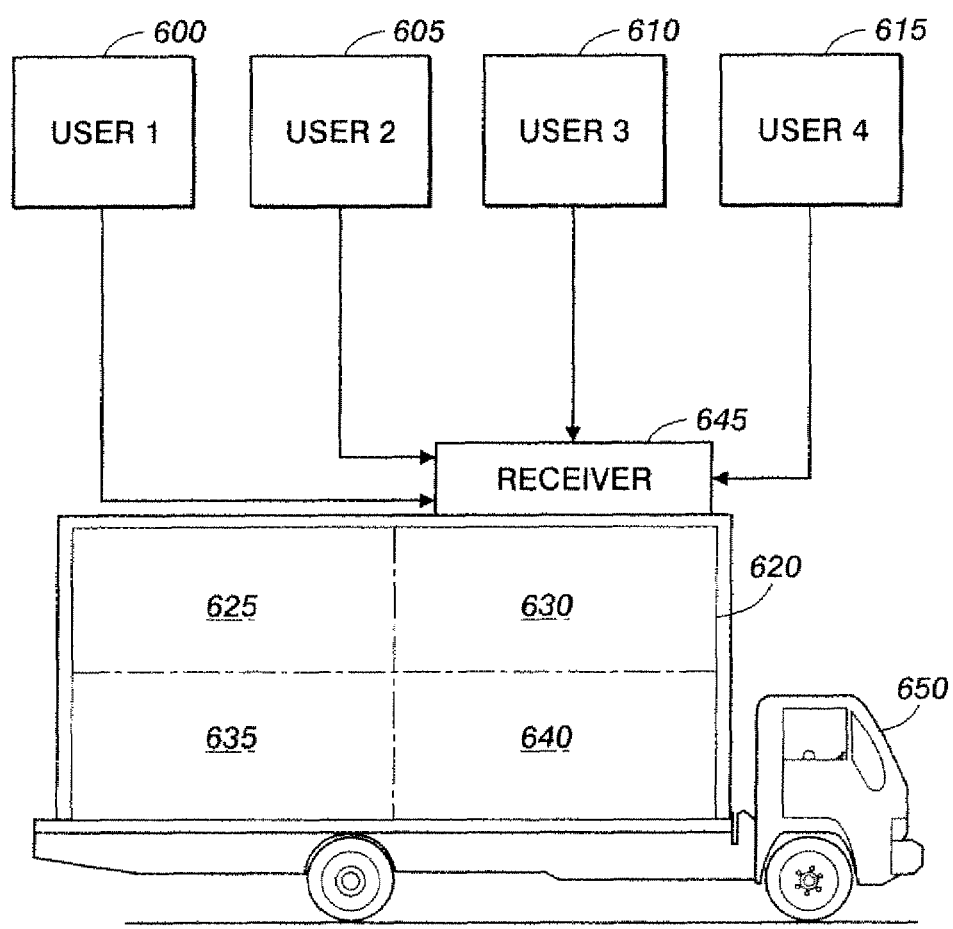
FIG. 6 depicts an exemplary method of displaying advertisements from multiple users on the same electronic paper screen according to an embodiment.

In an embodiment, as illustrated in FIG. 6, advertisements from multiple users may be displayed on the same electronic paper screen. An electronic paper screen 620 on a vehicle 650 may be divided into a plurality of display areas to simultaneously accommodate advertisements from a plurality of users. By allocating the electronic paper screen 620, multiple users may display their advertisements without excluding any user or users. For example, if a receiver 645 detects four users' signals, user 1 600, user 2 605, user 3 610 and user 4 615, the processor may divide the electronic paper screen 620 into four display areas, and may display the advertisements of the four users simultaneously. In an embodiment, the first user's 600 advertisement may be displayed on the top left of the display 625, the second user's 605 advertisement may be displayed on the top right 630, the third user's 610 advertisement may be displayed on the bottom left 635 and the fourth user's 615 advertisement may be displayed on the bottom right 640.

Figure 7:
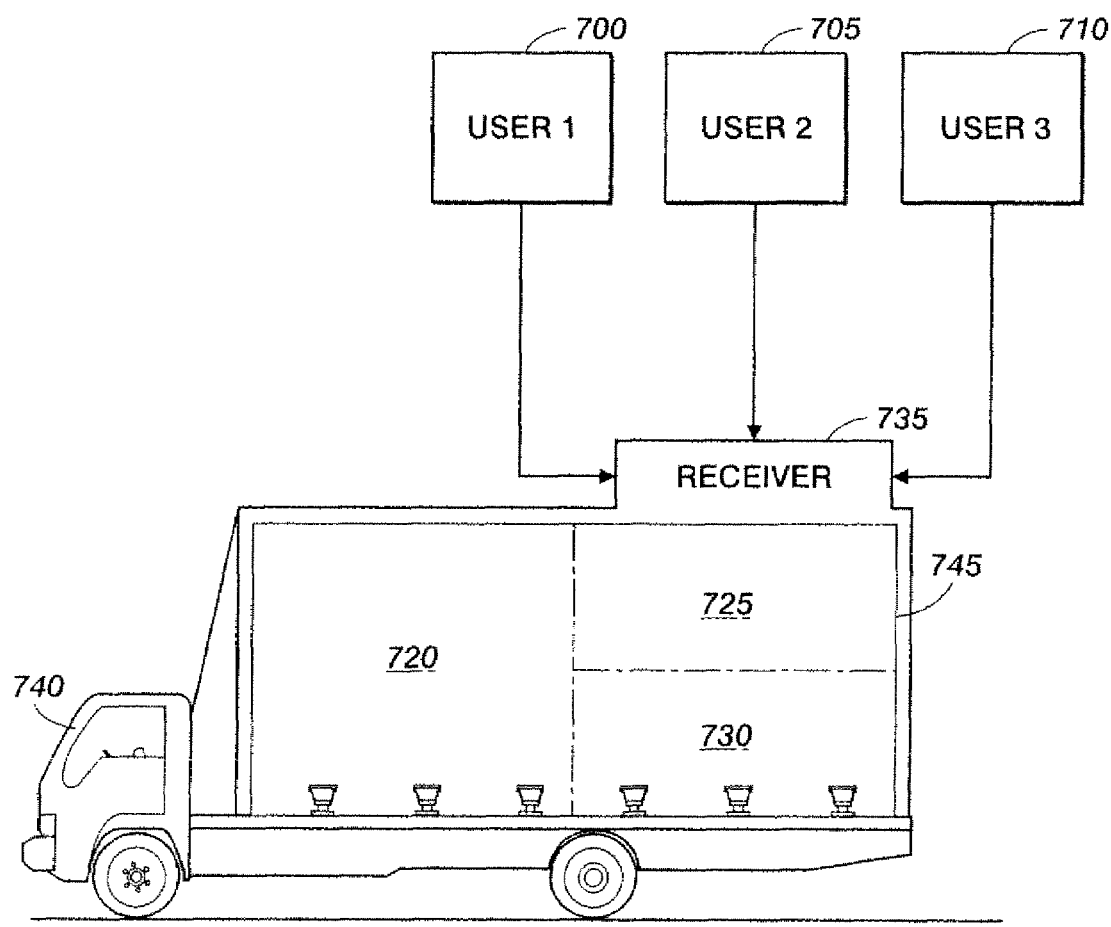
FIG. 7 depicts an exemplary method of displaying advertisements from multiple users on the same electronic paper screen based on the user's advertising bids according to an embodiment.

In an alternate embodiment, the size of the display areas may correspond to the amount of the users' advertisement bids. For example, as illustrated in FIG. 7, a receiver 735 may detect wireless transmissions from user one 700, user two 705 and user three 710, where user one 700 paid $500 for its advertisement and users two 705 and three 710 each paid $250 for their advertisements. In this instance, all three users' advertisements may be displayed simultaneously on a vehicle's 740 electronic paper screen 745, but user one's 700 advertisement may occupy a larger display area 720 than either the display area 725 for user two or the display area 730 for user three. It will be apparent to those of ordinary skill in the art that the electronic paper screen may be subdivided into more or fewer subdivisions. It will also be apparent to those of skill in the art that the electronic paper screen may be subdivided into less than a maximum number of subdivisions if fewer than such maximum number of transmissions are received.

Alternatively, advertisements for a plurality of users within range of the same receiver may be displayed in the sequence in which they are received. As such, if a processor receives requests to display advertisements from four users in the following order: user two, user three, user one, user four, then user two's advertisement may be displayed first, followed by user three's advertisement, user one's advertisement and user's four advertisement. In another embodiment, advertisements for a plurality of users within range of the same receiver may be displayed in an order corresponding to the amount of the user's bid. For example, if the receiver detects transmissions from two users, user one and user two, within the same range, and user one paid more for its advertisement than user two, user one's advertisement will be displayed first, followed by user two's advertisement.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system for displaying an advertisement on a vehicle comprising:
    a vehicle;
    a wireless receiver;
    a processor in communication with the receiver;
    an electronic paper screen in communication with the processor, wherein the electronic paper screen is located on the vehicle; and
    a processor readable storage medium in communication with the processor, wherein the processor readable storage medium contains one or more programming instructions for performing a method of displaying an advertisement on the vehicle, the method comprising:
        detecting, at a vehicle, a first wireless transmission from a first transmitter associated with a first advertiser, wherein the first wireless transmission is detected when the vehicle travels within range of the first transmitter,
        receiving, via the wireless receiver, advertisement information from the first transmitter, wherein the advertisement information pertains to a product or service offered by the first advertiser and comprises a first advertisement bid,
        detecting, at a vehicle, a second wireless transmission from a second transmitter associated with a second advertiser, wherein the second wireless transmission is detected when the vehicle travels within range of the second transmitter,
        receiving, via the wireless receiver, advertisement information from the second transmitter, wherein the advertisement information pertains to a product or service offered by the second advertiser and comprises a second advertisement bid,
        activating the electronic paper screen, via the processor, by supplying power to the electronic paper screen,
        allocating a first portion of the electronic paper screen to the first wireless transmission and a second portion of the electronic paper screen to the second wireless transmission, wherein a size of the first portion and the second portion is based on a comparison of the first advertisement bid and the second advertisement bid;
        displaying an advertisement associated with the first electronic transmission on the first portion of the electronic paper screen,
        displaying an advertisement associated with the second electronic transmission on the second portion of the electronic paper screen, and
        removing the power from the electronic paper screen, wherein the advertisements remain on the electronic paper screen after the power is removed.

2. The system of claim 1, wherein the processor readable storage medium further comprises one or more programming instructions for:

automatically displaying the advertisement associated with the first wireless transmission when the first wireless transmission is detected; and automatically displaying the advertisement associated with the second wireless transmission with the second wireless transmission is detected.

3. The system of claim 1, wherein the processor readable storage medium further comprises one or more programming instructions for performing one or more of the following:

displaying the advertisement associated with the first wireless transmission on the first portion of the electronic paper screen until a wireless transmission associated with another advertiser is detected; and displaying the advertisement associated with the second wireless transmission on the second portion of the electronic paper screen until a wireless transmission associated with another advertiser is detected.

4. The system of claim 1, wherein the one or more programming instructions for allocating a first portion of the electronic paper screen to the first wireless transmission and a second portion of the electronic paper screen to the second wireless transmission comprise one or more programming instructions for:

in response to a value of the first advertisement bid exceeding a value of the second advertisement bid, allocating portions of the electronic paper screen such that a size of the first portion exceeds a size of the second portion;

in response to the value of the second advertisement bid exceeding the value of the first advertisement bid, allocating portions of the electronic paper screen such that the size of the second portion exceeds the size of the first portion; and in response to the value of the first advertisement bid equaling the value of the second advertisement bid, allocating portions of the electronic paper screen such that the size of the first portion equals the size of the second portion.

5. The system of claim 1, wherein the one or more programming instructions for allocating a first portion of the electronic paper screen to the first wireless transmission and a second portion of the electronic paper screen to the second wireless transmission comprise one or more programming instructions for:

in response to the first advertisement bid equaling the second advertisement bid, displaying the advertisement associated with the first wireless transmission and the advertisement associated with the second wireless transmission simultaneously on the electronic paper screen.

6. A system for displaying an advertisement on a vehicle comprising:

a vehicle;

a wireless receiver;

a processor in communication with the receiver;

an electronic paper screen in communication with the processor, wherein the electronic paper screen is located on the vehicle; and a processor readable storage medium in communication with the processor, wherein the processor readable storage medium contains one or more programming instructions for performing a method of displaying an advertisement on a vehicle, the method comprising:

receiving, via the processor, first advertisement information pertaining to a first advertisement from an advertising agency, wherein the first advertisement information comprises a first advertisement bid associated with the first advertisement, storing the first advertisement information in the processor readable storage medium, detecting, at a vehicle, a wireless transmission from a transmitter associated with one of a plurality of advertisers when the vehicle travels within range of the transmitter, receiving an advertisement identifier from the transmitter, wherein the advertisement identifier corresponds to the first advertisement information, wherein the first advertisement information pertains to a product or service offered by the advertiser, activating the electronic paper screen, via the processor, by supplying power to the electronic paper screen, allocating a portion of the electronic paper screen to the first advertisement based on the first advertisement bid, displaying the first advertisement on the allocated portion of the electronic paper screen, and removing the power from the electronic paper screen, wherein the first advertisement remains on the electronic paper screen after the power is removed;

wherein the one or more programming instructions for allocating a portion of the electronic paper screen comprise one or more programming instructions for:

receiving second advertisement information from a second transmitter via a second wireless interface, wherein the second advertisement information pertains to a product or service offered by a second advertiser and comprises a second advertisement bid associated with the second advertisement information; and in response to a value of the first advertisement bid exceeding a value of the second advertisement bid, allocating a first portion of the electronic paper screen to the first advertisement and allocating a second portion of the electronic paper screen to the second advertisement, wherein a size of the first portion exceeds a size of the second portion;

in response to the value of the second advertisement bid exceeding the value of the first advertisement bid, allocating the first portion of the electronic paper screen to the first advertisement and allocating the second portion of the electronic paper screen to the second advertisement, wherein the size of the second portion exceeds the size of the first portion; and in response to the value of the first advertisement bid equaling the value of the second advertisement bid, allocating the first portion of the electronic paper screen to the first advertisement and allocating the second portion of the electronic paper screen to the second advertisement, wherein the size of the first portion equals the size of the second portion.

* * * * *